(12) United States Patent
Bhatia et al.

(10) Patent No.: US 10,361,907 B2
(45) Date of Patent: Jul. 23, 2019

(54) SYSTEM FOR NETWORKING AND ANALYZING GEOSPATIAL DATA, HUMAN INFRASTRUCTURE, AND NATURAL ELEMENTS

(71) Applicant: Northeastern University, Boston, MA (US)

(72) Inventors: Udit Bhatia, Boston, MA (US);
Devashish Kumar, Boston, MA (US);
Evan Kodra, Cambridge, MA (US);
Auroop R. Ganguly, Medford, MA (US)

(73) Assignee: Northeastern University, Boston, MA (US)

( * ) Notice: Subject to any disclaimer, the term of this patent is extended or adjusted under 35 U.S.C. 154(b) by 417 days.

(21) Appl. No.: 15/134,518

(22) Filed: Apr. 21, 2016

(65) Prior Publication Data
US 2016/0315801 A1    Oct. 27, 2016

Related U.S. Application Data

(60) Provisional application No. 62/153,243, filed on Apr. 27, 2015.

(51) Int. Cl.
*H04L 1/00* (2006.01)
*H04L 12/24* (2006.01)

(52) U.S. Cl.
CPC ............................... *H04L 41/0672* (2013.01)

(58) Field of Classification Search
CPC .................................................. H04L 41/0672
See application file for complete search history.

(56) References Cited

U.S. PATENT DOCUMENTS

| 6,115,743 A * | 9/2000 | Cowan ................ H04L 41/0654 709/223 |
| 6,327,669 B1 * | 12/2001 | Croslin ................... H04L 45/00 709/238 |
| 6,457,050 B1 * | 9/2002 | Cowan ...................... H04L 1/22 709/224 |
| 6,496,941 B1 * | 12/2002 | Segal .................. H04L 41/0654 709/235 |
| 9,020,875 B1 | 4/2015 | Compton |

(Continued)

FOREIGN PATENT DOCUMENTS

EP    2884453 A1    6/2015

OTHER PUBLICATIONS

Knight and Sullivan. "On the definition of survivability." University of Virginia, Department of Computer Science, Technical Report CS-TR-33-00 (2000).

(Continued)

*Primary Examiner* — Clemence S Han
(74) *Attorney, Agent, or Firm* — Arent Fox LLP

(57) ABSTRACT

A method and system for providing a recovery sequence for a network from a state of disruption to a state of partial or complete functionality are provided. The method and system can measure the response of a network to one or multiple hazards and can generate and compare the effectiveness of multiple recovery strategies in a quantitative and generalizable manner, providing a user with practical tools to implement an efficient restoration of the network.

19 Claims, 8 Drawing Sheets f: Fraction of nodes targeted for removal
f': Fraction of nodes restored to full functionality

(56) References Cited

U.S. PATENT DOCUMENTS

| | | | |
|---|---|---|---|
| 2012/0082027 A1* | 4/2012 | Kruglick | H04L 41/0663 370/225 |
| 2013/0227334 A1* | 8/2013 | Wang | G06Q 10/08 714/3 |
| 2014/0365196 A1 | 12/2014 | Melander et al. | |
| 2015/0143184 A1* | 5/2015 | Suzuki | H04L 41/0668 714/48 |
| 2016/0190789 A1* | 6/2016 | Zhu | H02H 1/0092 361/62 |

OTHER PUBLICATIONS

Svendsen, Nils Kalstad, and Stephen D. Wolthusen. "Connectivity models of interdependency in mixed-type critical infrastructure networks." Information Security Technical Report 12, No. 1 (2007): 44-55.

Linkov et al. "Changing the resilience paradigm." Nature Climate Change 4, No. 6 (2014): 407-409.

Rosato, Vittorio, L. Issacharoff, F. Tiriticco, Sandro Meloni, S. Porcellinis, and Roberto Setola. "Modelling interdependent infrastructures using interacting dynamical models." International Journal of Critical Infrastructures 4, No. 1/2 (2008): 63-79.

Barrat, Alain, Marc Barthélemy, and Alessandro Vespignani. "Weighted evolving networks: coupling topology and weight dynamics." Physical review letters 92, No. 22 (2004): 228701.

Banjidoost, Amin, Carl T. Haas, Mark A. Knight, and Andre JA Unger. "Integrated asset management of water and wastewater infrastructure systems: borrowing from industry foundation classes." 5th International/11th Construction Specialty Conference, Vancouver, British Columbia, Jun. 8 to Jun. 10, 2015: 299.

Gomez, Camilo, Mauricio Sanchez-Silva, Leonardo Dueñas-Osorio, and David Rosowsky. "Hierarchical infrastructure network representation methods for risk-based decision-making." Structure and Infrastructure Engineering vol. 9, No. 3 (2013): 260-274.

Lou, Z., M. Gunaratne, J. J. Lu, and B. Dietrich. "Application of Neural Network Model to Forecast Short-Term Pavement Crack Condition: Florida Case Study." Journal of Infrastructure Systems 7, No. 4 (2001).

Lam et al. "Identifying vulnerabilities in critical infrastructures by network analysis". "International Journal of Critical Infrastructures," vol. 9, No. 3, pp. 190-210. 2013.

Rezaei et al. "Disaster Management in Scale-Free Networks: Recovery from and Protection Against Intentional Attacks". arXiv:cond-mat/0504185 (2005).

Kizhakkedath et al. "An Agent-Based Modeling and Evolutionary Optimization Approach for Vulnerability Analysis of Critical Infrastructure Networks". Communications in Computer and Information Science, vol. 402, pp. 176-187 (2013).

Bhatia et al. Network Science Based Quantification of Resilience Demonstrated on the Indian Railways Network. PLoS One. Nov. 4, 2015;10(11):e0141890.

Albert R et al. The Internet Achilles' Heel: Error and Attack Tolerance of Complex Networks. Nature. 2000 406:378-382.

Ouyang et al. A three-stage resilience analysis framework for urban infrastructure systems. Structural Safety vols. 36-37, May-Jul. 2012, pp. 23-31.

Bocchini et al. Resilience and Sustainability of Civil Infrastructure: Toward a Unified Approach. J. Infrastruct. Syst., 2014, 20(2): 04014004.

Filippini et al. A modeling framework for the resilience analysis of networked systems-of-systems based on functional dependencies. Reliability Engineering & System Safety. vol. 125, May 2014, pp. 82-91.

Barker et al. Resilience-based network component importance measures. Reliability Engineering & System Safety vol. 117, Sep. 2013, pp. 89-97.

Henry et al. Generic metrics and quantitative approaches for system resilience as a function of time. Reliability Engineering & System Safety. vol. 99, Mar. 2012, pp. 114-122.

Cimellaro et al. Framework for analytical quantification of disaster resilience. Engineering Structures vol. 32, Issue 11, Nov. 2010, pp. 3639-3649.

Borgatti. Identifying sets of key players in a social network. Comput Math Organiz Theor (2006) 12: 21-34.

Pocock et al. The Robustness and Restoration of a Network of Ecological Networks. Science Feb. 24, 2012: vol. 335, Issue 6071, pp. 973-977.

\* cited by examiner

SYSTEM FOR NETWORKING AND ANALYZING GEOSPATIAL DATA, HUMAN INFRASTRUCTURE, AND NATURAL ELEMENTS

CROSS REFERENCE TO RELATED APPLICATIONS

This application claims priority under 35 § 119(e) of U.S. Provisional Application No. 62/153,243 filed on Apr. 27, 2015, entitled "Software System for Generating an Analyzing Quantitative Restoration and Recovery Strategies and Scenarios for Man-Made and Natural Complex Networks", the disclosure of which is hereby incorporated by reference.

STATEMENT REGARDING FEDERALLY SPONSORED RESEARCH OR DEVELOPMENT

The invention was developed with financial support from Grant No. 14475876 from The National Science Foundation and from Grant No. 1029711 from The National Science Foundation. The U.S. Government has certain rights in the invention.

BACKGROUND

Complex, large-scale networks exist in systems ranging from transportation to communications, water and power distribution, ecology, climate, biology and more. Complex large-scale networks include critical lifeline infrastructure networks, such as water distribution pipelines, power grids, railways, roadways, seaports, airports, and telecommunication networks, including the Internet. These critical lifeline infrastructure networks are subject to threats from natural and human-made hazards, such as severe weather events, power outages, climate extremes, terrorism, and cybercrime. Aging infrastructures, connectivity of lifeline functions, competition for resources, urbanization and movement towards coastlines have increased pressures on these critical networks.

The resilience of networks to various threats has been examined, particularly in the context of specific types of hazard and infrastructure and using known fragility models or component-level resource constraints. However, these studies have not provided any practical methods or tools for recovering a network that has been disrupted, particularly where component-specific information is not known.

SUMMARY OF THE INVENTION

The invention relates to a method and system that provide practical tools for recovery of networks from disruption. The method can be used to measure the response of a network to one or multiple hazards as well as to generate and compare the effectiveness of multiple restoration strategies in a quantitative and generalizable manner. Optimal recovery strategies can be different for different hazards, for different communities within a network and for different measures of partial recovery.

Other aspects of the method and system include the following:

1. A method for providing a recovery sequence for a network from a state of disruption to a state of partial or complete functionality, the network comprising a plurality of nodes interconnected by links, the network subject to disruption that removes from the network one or more nodes, one or more links, or a combination of one or more nodes and one or more links, wherein a disrupted node comprises a node through which traffic cannot flow and a functional node comprises a node through which traffic can flow, the method comprising:

providing a backend computing device comprising one or more processors and memory, and a user interface in communication with the backend computing device;

storing, in a database in the memory, data comprising identities of the nodes and the links of the network, attributes of the nodes, and attributes of the links;

receiving user preference data from a user at the user interface, the user preference data including a state of desired functionality, and one or more of a type of hazard, severity of hazard, location of hazard, resilience budget, and cost of node or link repair;

receiving, at the backend computing device, an identification of a plurality of the nodes as disrupted nodes;

determining, by a scientific engine comprising instructions stored in the memory for execution by the one or more processors, a priority recovery sequence by which disrupted nodes are to be restored to the state of desired functionality; and providing to the user interface a priority recovery sequence to restore the network to the desired state of functionality.

2. The method of item 1, wherein storing data comprises one or more of:

(a) populating a network data object with the data comprising the identities of the nodes and the links of the network, the attributes of the nodes, and the attributes of the links, and pushing the network data object to the database stored in the memory;

(b) augmenting or overriding the data in the network data object in the database with a further data input by a user at the user interface; and (c) querying node and link data to refresh the node and link data, and pushing an updated network data object to the database.

3. The method of item 2, wherein step (c) comprises querying the node and link data on a periodic schedule.

4. The method of any of items 1-3, wherein identifying the nodes as disrupted nodes comprises receiving an input from an external computing device, from sensors located at the nodes, or from the user interface comprising identities of disrupted nodes or links.

5. The method of any of items 1-4, further comprising:

receiving from a sensor located at a disrupted node data indicating that the disrupted node has been restored to functionality;

updating, by the scientific engine, the priority recovery sequence; and providing the updated priority recovery sequence to the user interface.

6. The method of any of items 1-5, wherein providing the priority recovery sequence to the user interface comprises transmitting a graphical display to the user interface comprising a graph illustrating a fraction of disrupted nodes vs. a state of critical functionality for one or a plurality of recovery sequences.

7. The method of any of items 1-6, further comprising transmitting a graphical display to the user interface comprising a graph illustrating a fraction of disrupted nodes vs. a state of critical functionality for a variety of hazard scenarios.

8. The method of any of items 1-7, further comprising providing to the user interface one or more metrics comprising financial savings, prevented down time of the network, prevented temporal business interruption, prevented socioeconomic damage, prevented disease spread, mitigated transportation losses in terms of traffic volume not delayed, prevented downtime in power supply from a blackout or brownout, prevented Internet downtime, or prevented natural ecosystem losses that result from alternative proposed recovery sequences.

9. The method of any of items 1-8, wherein the user interface is provided on an external computing device.

10. The method of any of items 1-9, wherein the step of determining a priority recovery sequence comprises:
   determining, by the scientific engine, a giant component of the nodes, the giant component comprising a largest connected set of nodes; and
   determining, by the scientific engine, an initial value of a state of critical functionality (SCF), the SCF ranging from 0 to 1 and comprising a fragmented functionality (FF) divided by a total functionality (TF), wherein:
      FF is a number of functional nodes in the giant component at a determined time, and
      TF is a total number of nodes in the giant component when the network is fully functional; and
   simulating, by the scientific engine, restoration of the disrupted nodes one by one to functionality until a desired value of SCF is obtained.

11. The method of item 10, wherein simulating restoration of a disrupted node comprises adding the disrupted node and the connections of the disrupted node to its neighboring nodes back to the network.

12. The method of any of items 10-11, wherein determining a priority recovery sequence comprises:
   (a) determining a first SCF value after disruption;
   (b) simulating restoration of one of the disrupted nodes to full functionality;
   (c) calculating a number of functional nodes in the giant component;
   (d) determining a further SCF value; and
   (e) repeating steps (b) through (d) until a desired SCF value is reached.

13. The method of item 12, wherein in step (e), the desired SCF value is 1.

14. The method of any of items 1-13, wherein the step of receiving an input of a disruption further comprises identifying links between any disrupted node and a neighboring node.

15. The method of any of items 1-14, wherein determining a priority recovery sequence comprises determining multiple recovery sequences and comparing the multiple recovery sequences to determine the priority recovery sequence.

16. The method of any of items 1-15, wherein the determined recovery sequence comprises one or more of:
   (a) a sequence in which a desired state of critical functionality (SCF) value can be achieved in a fastest time.
   (b) a sequence in which a desired SCF value can be achieved with a fewest number of steps.
   (c) placing the disrupted nodes in order by degree, wherein degree comprises a number of links to a node, and simulating restoration of the disrupted nodes to functionality, in order from largest degree to smallest degree, until a desired value of SCF is obtained;
   (d) placing the disrupted nodes in order by clustering coefficient, wherein the clustering coefficient is proportional to a number of links to nodes to which a disrupted node is linked, and simulating restoration of the disrupted nodes to functionality, in order from largest clustering coefficient to smallest clustering coefficient, until a desired value of SCF is obtained;
   (e) placing the disrupted nodes in order of betweenness centrality, wherein the betweenness centrality is a measure of how frequent a disrupted node is a bridge between otherwise disconnected groups of intra-linked nodes, and simulating restoration of the disrupted nodes to functionality, in order from largest betweenness centrality to smallest betweenness centrality, until a desired value of SCF is obtained;
   placing the disrupted nodes in order of closeness centrality, wherein the closeness centrality is an inverse of a summation of a number of network steps between a node and other nodes, and simulating restoration of the disrupted nodes to functionality, in order from smallest closeness centrality to largest closeness centrality, until a desired value of SCF is obtained;
   (g) placing the disrupted nodes in order of eigenvector centrality, wherein the eigenvector centrality is a sum of the centrality values of each node that is linked to a disrupted node, and simulating restoration of the disrupted nodes to functionality, in order from largest eigenvector centrality to smallest eigenvector centrality, until a desired value of SCF is obtained; and
   (h) placing the disrupted nodes in a random order, and simulating restoration of the disrupted nodes to functionality in the random order, until a desired value of SCF is obtained.

17. The method of any of items 1-16, wherein node attributes include one or more of:
   (a) strength measured as a volume of originations or terminations at the node or measured as a number of objects originating or terminating at the node; and
   (b) degree, the degree comprising a number of connections of one node with other nodes.

18. A method of recovering a network from a state of disruption to a state of partial or complete functionality, the network comprising a plurality of nodes interconnected by links, the network subject to disruption that removes from the network one or more nodes, one or more links, or a combination of one or more nodes and one or more links, wherein a disrupted node comprises a node through which traffic cannot flow and a functional node comprises a node through which traffic can flow, the method comprising:
   performing the method of any of items 1-17; and
   implementing the recovery sequence.

19. The method of item 18, wherein implementing the recovery sequence comprises restoring at least a first disrupted node or a first disrupted link to functionality according to the recovery sequence.

20. The method of any of items 18-19, wherein the network comprises a transportation network, an energy network, an ecological network, a communication network, an Internet network, a water supply network, a financial network, a social network, a climate and weather network, a geopolitical network, or a disease network.

21. The method of any of items 18-19, wherein the network comprises a telecommunication network or an Internet network.

22. The method of any of items 18-21, wherein the network is connected to a further network, and the network and the further network are recovered as a composite network.

23. The method of any of items 18-22, wherein traffic flowing through a node comprises data, objects, people, or non-human animals.

24. A system for determining a recovery sequence for a network from a state of disruption to a state of partial or complete functionality, the network comprising a plurality of nodes interconnected by links, the network subject to disruption that removes from the network one or more nodes, one or more links, or a combination of one or more nodes and one or more links, wherein a disrupted node comprises a node through which traffic cannot flow and a functional node comprises a node through which traffic can flow, the system comprising:

a backend computing device comprising one or more processors and memory, a user interface in communication with the backend computing device, and machine-readable instructions stored in the memory that, upon execution by the one or more processors cause the system to carry out operations comprising the method of any if items 1-23.

25. A non-transitory computer readable medium with computer executable instructions stored thereon executed by a processor to perform the method of any of items 1-23.

26. A method for providing a recovery sequence for a network from a state of disruption to a state of partial or complete functionality, the network comprising a plurality of nodes interconnected by links, the network subject to disruption that removes from the network one or more nodes, one or more links, or a combination of one or more nodes and one or more links, wherein a disrupted node comprises a node through which traffic cannot flow and a functional node comprises a node through which traffic can flow, the method comprising:

storing, in memory, data comprising identities of the nodes and the links of the network, attributes of the nodes, and attributes of the links;

receiving, at one or more processors in communication with the memory, user preference data from a user, the user preference data including a state of desired functionality, and one or more of a type of hazard, severity of hazard, location of hazard, resilience budget, and cost of node or link repair;

receiving, at the one or more processors, an identification of a plurality of the nodes as disrupted nodes;

determining, by instructions stored in the memory for execution by the one or more processors, a priority recovery sequence by which disrupted nodes are to be restored to the state of desired functionality; and providing to the user, by the one or more processors, a priority recovery sequence to restore the network to the desired state of functionality.

27. The method of item 26, wherein storing data comprises one or more of:

(a) populating a network data object with the data comprising the identities of the nodes and the links of the network, the attributes of the nodes, and the attributes of the links, and pushing the network data object to the database stored in the memory;

(b) augmenting or overriding the data in the network data object in the database with a further data input by a user at the user interface; and (c) querying node and link data to refresh the node and link data, and pushing an updated network data object to the database.

28. The method of item 27, wherein step (c) comprises querying the node and link data on a periodic schedule.

29. The method of any of items 26-28, wherein identifying the nodes as disrupted nodes comprises receiving an input from an external computing device, from sensors located at the nodes, or from the user interface comprising identities of disrupted nodes or links.

30. The method of any of items 26-29, further comprising:

receiving from a sensor located at a disrupted node data indicating that the disrupted node has been restored to functionality;

updating, by the scientific engine, the priority recovery sequence; and providing the updated priority recovery sequence to the user.

31. The method of any of items 26-30, wherein providing the priority recovery sequence to the user comprises transmitting a graphical display to a user interface comprising a graph illustrating a fraction of disrupted nodes vs. a state of critical functionality for one or a plurality of recovery sequences.

32. The method of any of items 26-31, further comprising transmitting a graphical display to a user interface comprising a graph illustrating a fraction of disrupted nodes vs. a state of critical functionality for a variety of hazard scenarios.

33. The method of any of items 26-32, further comprising providing to the user one or more metrics comprising financial savings, prevented down time of the network, prevented temporal business interruption, prevented socio-economic damage, prevented disease spread, mitigated transportation losses in terms of traffic volume not delayed, prevented downtime in power supply from a blackout or brownout, prevented Internet downtime, or prevented natural ecosystem losses that result from alternative proposed recovery sequences.

34. The method of any of items 26-33, further comprising providing a user interface on an external computing device.

35. The method of any of items 26-34, wherein the step of determining a priority recovery sequence comprises:

determining a giant component of the nodes, the giant component comprising a largest connected set of nodes; and determining an initial value of a state of critical functionality (SCF), the SCF ranging from 0 to 1 and comprising a fragmented functionality (FF) divided by a total functionality (TF), wherein:

FF is a number of functional nodes in the giant component at a determined time, and TF is a total number of nodes in the giant component when the network is fully functional; and simulating restoration of the disrupted nodes one by one to functionality until a desired value of SCF is obtained.

36. The method of item 35, wherein simulating restoration of a disrupted node comprises adding the disrupted node and the connections of the disrupted node to its neighboring nodes back to the network.

37. The method of item 35-36, wherein determining a priority recovery sequence comprises:

(a) determining a first SCF value after disruption;

(b) simulating restoration of one of the disrupted nodes to full functionality;

(c) calculating a number of functional nodes in the giant component;

(d) determining a further SCF value; and (e) repeating steps (b) through (d) until a desired SCF value is reached.

38. The method of item 37, wherein in step (e), the desired SCF value is 1.

39. The method of any of items 26-38, wherein the step of receiving an input of a disruption further comprises identifying links between any disrupted node and a neighboring node.

40. The method of any of items 26-39, wherein determining a priority recovery sequence comprises determining multiple recovery sequences and comparing the multiple recovery sequences to determine the priority recovery sequence.

41. The method of any of items 26-40, wherein the determined recovery sequence comprises one or more of:

(a) a sequence in which a desired state of critical functionality (SCF) value can be achieved in a fastest time.

(b) a sequence in which a desired SCF value can be achieved with a fewest number of steps.

(c) placing the disrupted nodes in order by degree, wherein degree comprises a number of links to a node, and simulating restoration of the disrupted nodes to functionality, in order from largest degree to smallest degree, until a desired value of SCF is obtained;

(d) placing the disrupted nodes in order by clustering coefficient, wherein the clustering coefficient is proportional to a number of links to nodes to which a disrupted node is linked, and simulating restoration of the disrupted nodes to functionality, in order from largest clustering coefficient to smallest clustering coefficient, until a desired value of SCF is obtained;

(e) placing the disrupted nodes in order of betweenness centrality, wherein the betweenness centrality is a measure of how frequent a disrupted node is a bridge between otherwise disconnected groups of intra-linked nodes, and simulating restoration of the disrupted nodes to functionality, in order from largest betweenness centrality to smallest betweenness centrality, until a desired value of SCF is obtained;

(f) placing the disrupted nodes in order of closeness centrality, wherein the closeness centrality is an inverse of a summation of a number of network steps between a node and other nodes, and simulating restoration of the disrupted nodes to functionality, in order from smallest closeness centrality to largest closeness centrality, until a desired value of SCF is obtained;

(g) placing the disrupted nodes in order of eigenvector centrality, wherein the eigenvector centrality is a sum of the centrality values of each node that is linked to a disrupted node, and simulating restoration of the disrupted nodes to functionality, in order from largest eigenvector centrality to smallest eigenvector centrality, until a desired value of SCF is obtained; and (h) placing the disrupted nodes in a random order, and simulating restoration of the disrupted nodes to functionality in the random order, until a desired value of SCF is obtained.

42. The method of any of items 26-41, wherein node attributes include one or more of:

(a) strength measured as a volume of originations or terminations at the node or measured as a number of objects originating or terminating at the node; and (b) degree, the degree comprising a number of connections of one node with other nodes.

43. The method of any of items 26-42, wherein at least a portion of the one or more processors and the memory are provided in a backend computing device and a user interface is provided in communication with the backend computing device.

44. A method of recovering a network from a state of disruption to a state of partial or complete functionality, the network comprising a plurality of nodes interconnected by links, the network subject to disruption that removes from the network one or more nodes, one or more links, or a combination of one or more nodes and one or more links, wherein a disrupted node comprises a node through which traffic cannot flow and a functional node comprises a node through which traffic can flow, the method comprising:

performing the method of any of items 26-43; and
implementing the recovery sequence.

45. The method of item 44, wherein implementing the recovery sequence comprises restoring at least a first disrupted node or a first disrupted link to functionality according to the recovery sequence.

46. The method of any of items 44-45, wherein the network comprises a transportation network, an energy network, an ecological network, a communication network, an Internet network, a water supply network, a financial network, a social network, a climate and weather network, a geopolitical network, or a disease network.

47. The method of any of items 44-45, wherein the network comprises a telecommunication network or an Internet network.

48. The method of any of items 44-47, wherein the network is connected to a further network, and the network and the further network are recovered as a composite network.

49. The method of any of items 46-48, wherein traffic flowing through a node comprises data, objects, people, or non-human animals.

50. A system for determining a recovery sequence for a network from a state of disruption to a state of partial or complete functionality, the network comprising a plurality of nodes interconnected by links, the network subject to disruption that removes from the network one or more nodes, one or more links, or a combination of one or more nodes and one or more links, wherein a disrupted node comprises a node through which traffic cannot flow and a functional node comprises a node through which traffic can flow, the system comprising:

a backend computing device comprising one or more processors and memory, a user interface in communication with the backend computing device, and machine-readable instructions stored in the memory that, upon execution by the one or more processors cause the system to carry out operations comprising the method of any if items 26-49.

51. A non-transitory computer readable medium with computer executable instructions stored thereon executed by a processor to perform the method of any of items 26-49.

DESCRIPTION OF THE DRAWINGS

The invention will be more fully understood from the following detailed description taken in conjunction with the accompanying drawings in which.

DETAILED DESCRIPTION OF THE INVENTION

Figure 1:
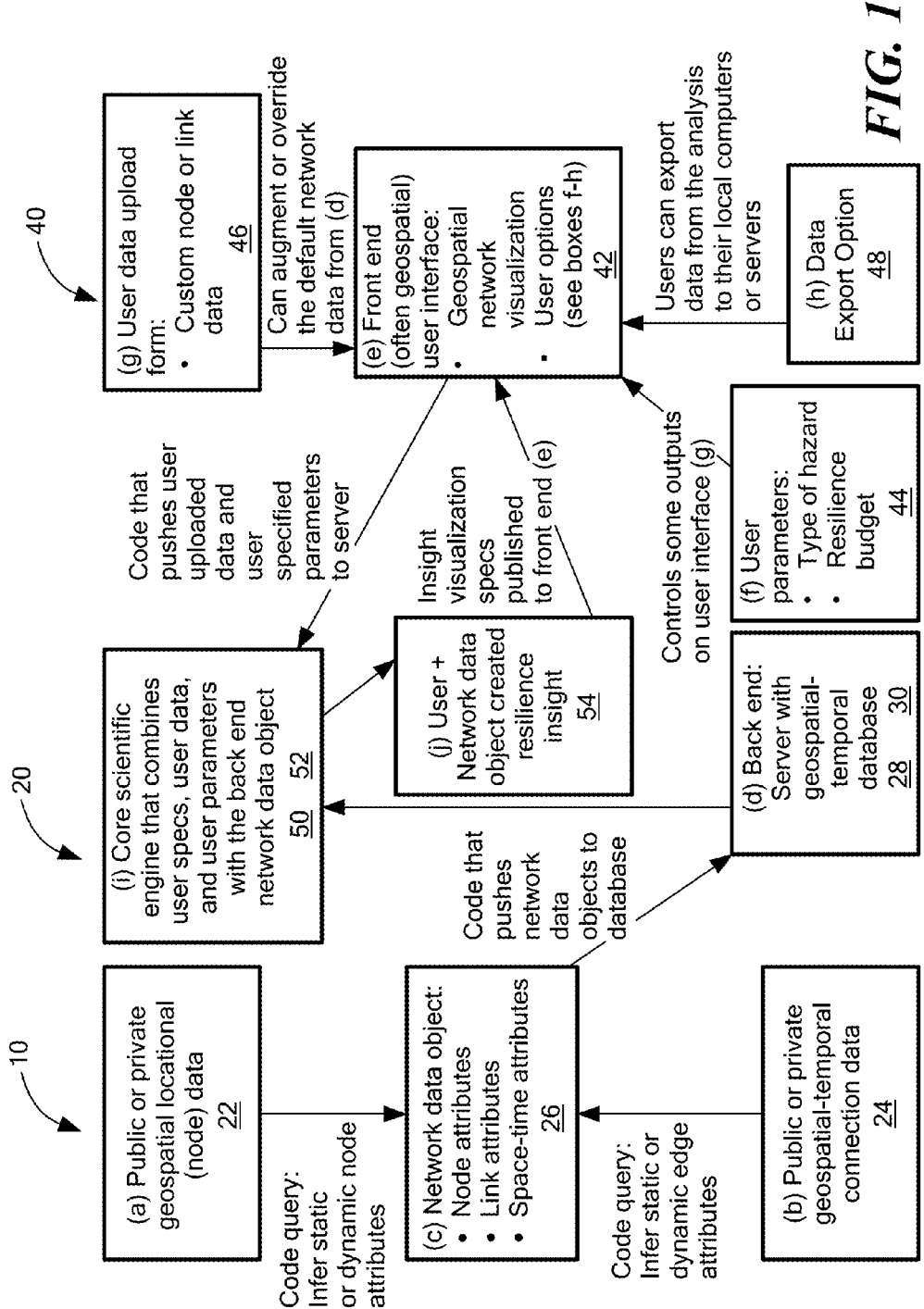
FIG. 1 is a schematic block diagram of an embodiment of a method and system for planning for recovery of a network.

This application incorporates by reference the entire disclosure of U.S. Provisional Application No. 62/153,243 filed on Apr. 27, 2015, entitled "Software System for Generating an Analyzing Quantitative Restoration and Recovery Strategies and Scenarios for Man-Made and Natural Complex Networks".

The invention relates to a method and system that provides a generalizable solution for recovery of a real world lifeline network from a state of disruption to a desired state of partial or complete functionality. A network can be considered as a plurality of nodes interconnected by links. The network is subject to disruption that removes from the network one or more nodes, one or more links, or a combination of one or more nodes and one or more links. A disrupted node is a node through which traffic cannot flow, and a functional node is a node through which traffic can flow.

The method and system provide a recovery sequence for a network from a state of disruption to a state of partial or complete functionality by employing a metric, termed herein a State of Critical Functionality (SCF), to measure the network at any state of functionality. The SCF ranges from 0 to 1, where at 0 the network is completely dysfunctional, and at 1 the network is at full functionality. An SCF between 0 and 1 means that the network is operating at a state of partial functionality. The recovery solution is a time or step-based process wherein each component is restored one by one until the $SCF=1$ or any desired value of partial functionality. A component of a network can be a node or a link between nodes.

Multiple proposed recovery sequences can be generated, where a recovery sequence is the proposed order in which components can be restored to functionality. Recovery sequences can be proposed using both intuitive and more sophisticated metrics, including but not limited to: attributes such as number of connections a component has and volume of data that passes through a component, and centrality measures for a given connection that quantifies its importance to data flowing through the network.

Multiple generated recovery sequences can be compared to each other. In some embodiments, an optimal recovery sequence for any desired SCF value is, all else held equal, the recovery sequence that achieves the desired SCF value fastest or with the fewest number of steps.

In some embodiments, a statistical significance testing routine can be included, in which many randomly generated recovery sequences are determined. In some embodiments, a proposed recovery sequence is said to be more effective if it achieves a desired SCF faster than a majority (e.g., $\geq 95\%$) of randomly suggested sequences.

In some embodiments, recovery sequences can be generated for multiple interconnected networks provided it is known how those networks are connected to each other. For example, one network can be a power grid and a further network can be a transportation system. If the power grid were disrupted, the transportation system could be disrupted as well. Concomitantly, recovery of the power grid could result in recovery of the transportation system. In some embodiments, recovery sequences can be generated for communities within a network.

In some embodiments, the method and system can be implemented to provide proactive resilience planning, in terms of ensuring the most important components of a system are sufficiently resilient and/or to conceive effective recovery in the event that a network might be completely or partially disrupted.

In some embodiments, the method and system can be implemented as a real or near-real time monitoring and decision support device, where in the event of a disruption the method can suggest recovery priorities, for example, when sensors indicate that one or more components of the lifeline network have been disrupted.

In some embodiments, the network resilience framework can consider link damage or removal and resource mobilization strategies, as well as the consideration of dynamic network flow properties, including time varying network attributes and real time data ingestion.

In some embodiments, various metrics can be provided to quantify gains from implementing one or each of the recovery sequences. Such quantifiable metrics can be based on measurements of efficiency, performance, financial analyses, and the like. Examples can include, without limitation, financial savings, prevented down time of the network, prevented business interruption in financial and time terms, prevented socioeconomic damage, prevented disease spread, mitigated transportation losses in terms of traffic volume not delayed, prevented downtime in power supply from a blackout or brownout, prevented Internet downtime, prevented criminal activity, and/or prevented natural ecosystem losses that result from alternative proposed recovery sequences.

Anticipatory analysis can help stakeholders design systematic recovery and anti-fragility strategies for lifeline critical networks, including transportation, water and wastewater, power and fuels, and communications systems. In addition to engineered systems such as lifeline critical networks, the approach can be generalized to natural systems such as ecological networks subjected to perturbations.

Lifeline networks can either exist more literally and physically or be imposed via data analysis on many complex systems. Examples include the following:

Energy systems: Nodes can be power plants, substations, and buildings that consume energy, and links can be the transmission and distribution lines that connect them.

Transportation systems: Nodes can be origins/destinations and links can be roads, flight paths, railway lines, and water channels that connect them. Nodes can also be stopping points between origins and destinations.

Ecological systems: Nodes can be species, and links can be dependencies between species, including, for example, predator/prey or symbiotic relationships.

Social networks: Nodes can be people or organizations of people, and links can be relationships or geographical connections between them. Alternatively, in a digital space (e.g., Twitter), links can be explicitly labeled connections.

Communications systems: Nodes can be communications devices, and links can be inferred by data demonstrating that devices have communicated with each other. Links can also be physical infrastructure, such as, for example, cell phone towers that can be connected to mobile devices.

Internet networks: Nodes can be servers, data centers, and/or devices (computers) connected to servers, and links can be connections between them.

Climate and weather systems: Nodes can be points in space, and links can be imposed by calculating correlations between weather patterns among those points in space.

Disease systems: Nodes can be infected organisms (people, plants, animals), and links can be the inferred connection where diseases spread.

Water supply systems: Nodes can be consumption points (residences, industrial and commercial properties), water resources engineering infrastructure (water treatment facilities, desalination plants, dams, turbines, etc.), and natural components (ponds, lakes, rivers, aquifers, oceans). Links can be connections between them (water distribution, natural connection points).

Traffic flowing through networks can include data, physical objects, people, and non-human animals.

It will be appreciated that the method and system can be used for other types of networks. In addition, the technology can be applied to two or more networks that are interconnected (e.g., an electric grid that powers a communication network as well as a railway network and an Internet network). Any of these networks could be hierarchical or nested as well. For example, a transportation network could be comprised of a subway system, where each node is a subway station. Each of those subway stations could be a network itself, dependent with multiple sub-components (nodes) that are linked.

Accordingly, the system and method provide a quantitative methodology for recovery of any real world lifeline network and can be generalized to any network or system. The SCF metric, which uses the "giant component," is a relative measure that can be adapted to any lifeline network or complex system. Also, the present system and method provide the generic ability to compare the effectiveness of multiple recovery strategies or sequences for any real lifeline networks under disruption.

In some embodiments, a method and system for providing a recovery sequence for a network can be implemented as software- and hardware-based tools using a backend computing device 20 in communication with a user interface 40, described further below. A database 30 is provided to store node and link data related to a network of interest. A priority recovery sequence can be generated by a scientific engine 50 in communication with the database and the user interface.

FIG. 1 shows an embodiment of a system 10 in a "planning"/"scenario analysis" form, in which a complex network can also be, but is not necessarily, monitored in real time. (Real time monitoring will be discussed further below in conjunction with FIG. 3.) In FIG. 1 (and FIG. 3), boxes are digital objects and arrows with associated text are actions, which can be either automated, computer-driven actions or user-modulated actions. A digital object can contain content, such as data elements and attributes of the data elements as well as attributes of the digital object itself. Each data object can be assigned an identifier for access from any system for requesting content, adding or modifying content, interaction between data objects, and the like. A digital object architecture can allow ease of access and movement of the digital objects among various computing systems and computer networks.

Referring to FIG. 1, one digital object 22 contains public or private geospatial locational node data, and can also optionally describe other attributes of the node. Geospatial data can include, for example, latitude, longitude, and height above sea level. As a further example, for an airline network in which a node is an airport, a node attribute can be annual air traffic volume that goes to and from the airport. Another digital object 24 contains data that describes the geospatial and/or temporal connections or links between nodes, either just the fact that they are connected or, optionally and additionally, attributes that quantify the nature of those connections. For example, for an airline network, a link attribute can be a volume of flights between two airports. For both objects 22 and 24, to obtain this node and link data, the computing device can query external public or private data repositories, either once or on an automated, periodic schedule. In the latter automated case, code can be provided that queries the node and link data on a timer, refreshing the status of the node and link data. Those queries can populate a network data object 26; that data object hosts all of the nodes and attributes, the links (between pairwise sets of nodes) and the space and potentially time attributes of the network. Any time the network data object is refreshed via those queries, a code can push that updated network data object as a snapshot to a back end database 28, which can reside on a backend or database server.

Node attributes can include, for example and without limitation, strength measured as a volume of originations or terminations at the node or measured as a number of objects originating or terminating at the node; a financial value associated with a node in terms of the cost of repairing, recovering, or replacing that node; a financial value associated with a node in terms of business interruption costs related to that node being out of service; geospatial information, such as latitude, longitude, and height above sea level; a quantifiable social cost or variable associated with that node (e.g., if a node is a neighborhood, that node might be associated with a poverty rate, an employment rate, and/or quantification of access to social services and/or alternative transportation; data about civil infrastructure (roads, bridges, tunnels, water and power distribution systems, and the like) associated with the node; and natural environment data associated with the node. Link attributes can similarly include, without limitation, strength measured as a volume of traffic measured as a number of objects along or through the link; a financial value associated with a link in terms of the cost of repairing, recovering, or replacing that link; a financial value associated with a link in terms of business interruption costs related to that link being out of service; geospatial information, such as latitude, longitude, and height above sea level; a quantifiable social cost or variable associated with that link (e.g., if a link is in a neighborhood, that link might be associated with a poverty rate, an employment rate, and/or quantification of access to social services and/or alternative transportation; data about civil infrastructure (roads, bridges, tunnels, water and power distribution systems, and the like) associated with the link; and natural environment data associated with the link. Attributes of both nodes and links can be accorded a weight, such that certain attributes can have a greater impact on the determined recovery sequences.

The user interface provides a digital object 42, which is provided at the front end 40 of the system that the user sees. The digital object 42 can be loaded into, for example, a web browser or a mobile application interface. The user sees a geospatial network visualization augmented by default resilience outputs, described further below. The front end can allow for several user-driven specifications. For example, the user can input node or link attributes and a weighting for each attribute. In some embodiments, a digital object 44 contains parameters that a user can specify when doing resilience planning and scenario analysis. These parameters can include the type and severity of hazard that could impact the system. For example, a winter storm that hits an airport in Boston could cause delays that cascade to airports far away, and the user could specify the location of that hazard as well as, for example, the number of inches of snow. Additionally, the user could input a resilience budget, either in terms of long term planning, as hazard response, or both, and the cost of taking specific measures such as repairing one node or link in the network. Digital object 46 is a feature that can allow a user to upload data in a specific, definitive form that can either override properties of the network data object stored in the database 30 or augment that data in the database. For example, in an airline network, a user could upload data that estimates the cost of repairing a "node" (an airport) and factor that into the restoration analysis. Digital object 48 can allow a user to export the data from an analysis to a local machine or server.

Figure 2:
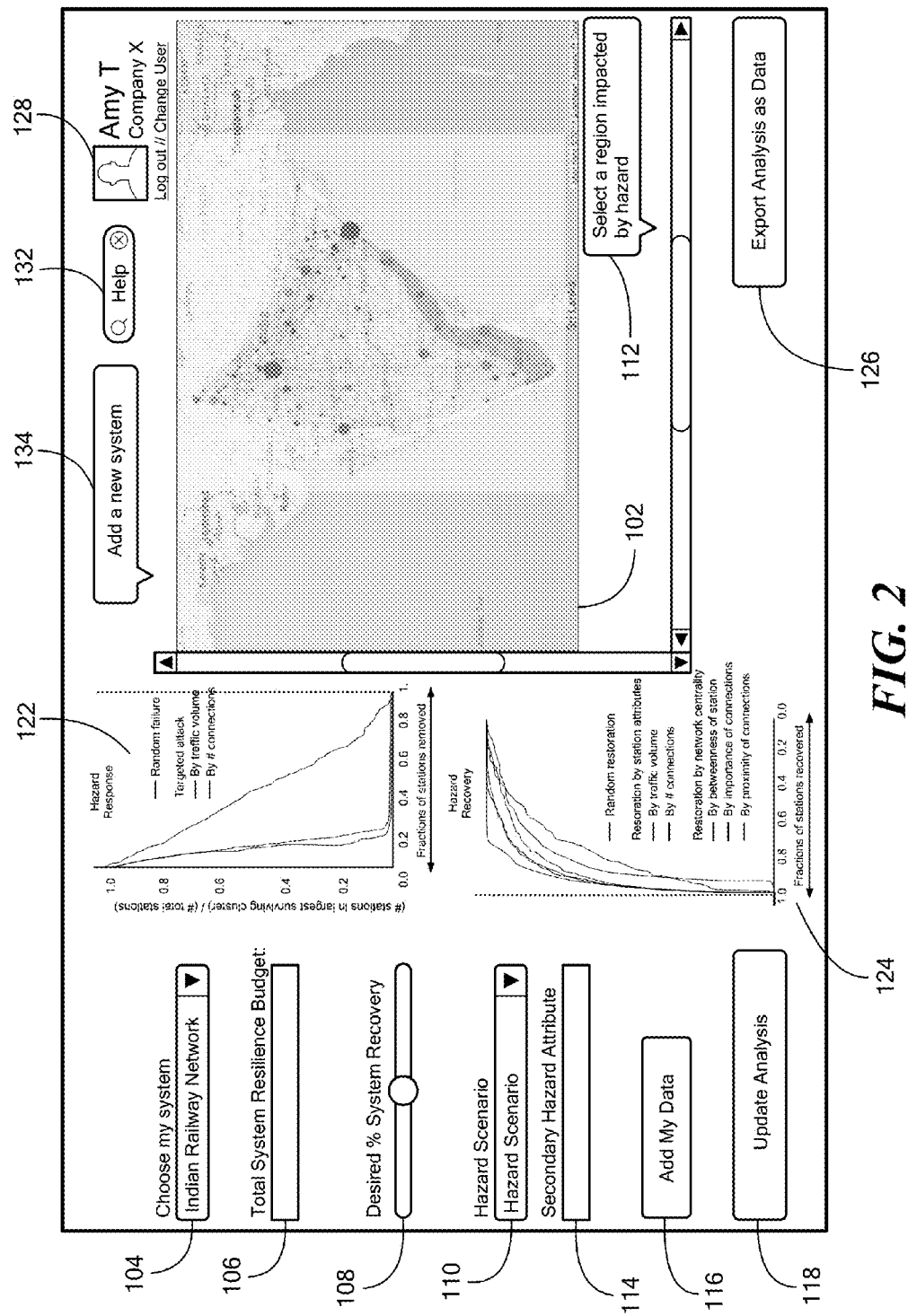
FIG. 2 is an illustration of an embodiment of a graphical user interface of the method and system.

A digital object 52 can combine user specified inputs (data and parameters) with the backend digital object 28 to produce a data object 54 that contains a resilience planning insight. More particularly, a core scientific engine 50 analyzes multiple methods of hazard response and hazard recovery to find an optimal way to bring the system back to (user specified) partial or full functionality. The methods used within object 52 can consider a variety of network science metrics, including those related to degree and centrality, as well as intuitive metrics like node and link volume and also metrics specified by the user (such as cost to repair any link or node), and any attribute weightings to find an optimal recovery strategy conditional on all of those inputs. That strategy can be provided to the user interface 42. For example, the strategy can be translated into and displayed as a set of graphics. FIG. 2 illustrates an embodiment of a graphic, described further below. The digital object 48 can be provided to allow the user to export the data that quantifies that optimal strategy to a local computer or server.

The engine 50 can also provide to the user interface 42 one or more metrics to quantify gains or advantages from implementing one or each of the recovery sequences. Such quantifiable metrics can include, without limitation, financial savings, prevented down time of the network, prevented temporal business interruption, prevented socioeconomic damage, prevented disease spread, mitigated transportation losses in terms of traffic volume not delayed, prevented downtime in power supply from a blackout or brownout, prevented Internet downtime, prevented criminal activity, and/or prevented natural ecosystem losses that result from alternative proposed recovery sequences.

FIG. 2 is an exemplary (but not exhaustive) look at how the user can interact with the method and system (i.e., digital objects 42, 44, 46, 48 in FIG. 1). User input can be received through any suitable graphical user interface mechanism, such as text input boxes, drop down menu selections, buttons, sliders, and the like. For example, in some embodiments the interface can be configured to allow a user to choose a system 104 that is pre-configured on the back end (i.e., in object 28 from FIG. 1), to allocate a resilience budget 106, to specify a percentage of network recovery 108 (0% to 100%), and to select a hazard to analyze 110. In one example case using the Indian Railway Network as the network, illustrated on a map 102, the user may have selected "Tropical Cyclone", which by default might impact a region in the southeastern coast. The user can interact with the map, indicated at 112, and select the region impacted by the hazard. The user can also add a secondary hazard attribute 114 (which would be constrained by the system dynamically after a user selects a type of hazard). The user can also add further data 116. The system can prompt the user to add the data in a specific form that will augment the network data stored in the back end database. User-added data could be, for example, costs estimated to repair each node or link (for example, an amount specific to railway stations, or an amount per specific train tracks between stations). Once a user has selected all of these configurations, the user can update the analysis 118, by which the scientific engine would redetermine the recovery sequence(s). The "Hazard response" and "Hazard recovery" graphics 122, 124 would be updated, and a new overlay on the map showing the system of interest post-hazard would be presented. In some embodiments, a user can export that data from an analysis to a local computer or server 126. The top right of FIG. 2 shows an example in which a particular user is logged in at 128 and from a particular organization, along with a logout button. The system can include an FAQ or Help button 132 that can be searched (here shown to the left of the login options). An ability to interact with a system administrator to add a new network 134 (e.g., in this case the user might want to add a new network to analyze, like the Indian power grid) can be provided.

FIG. 2 illustrates one exemplary manifestation of the method and system and how it could look to a user, specifically in a web browser on a laptop or PC. It will be appreciated that the features of the user input and interaction with the back end could vary from this depiction. Also, a different manifestation could be displayed in a mobile (phone or tablet) app, which can be substantively similar but optimized for viewing on the mobile app.

Figure 3:
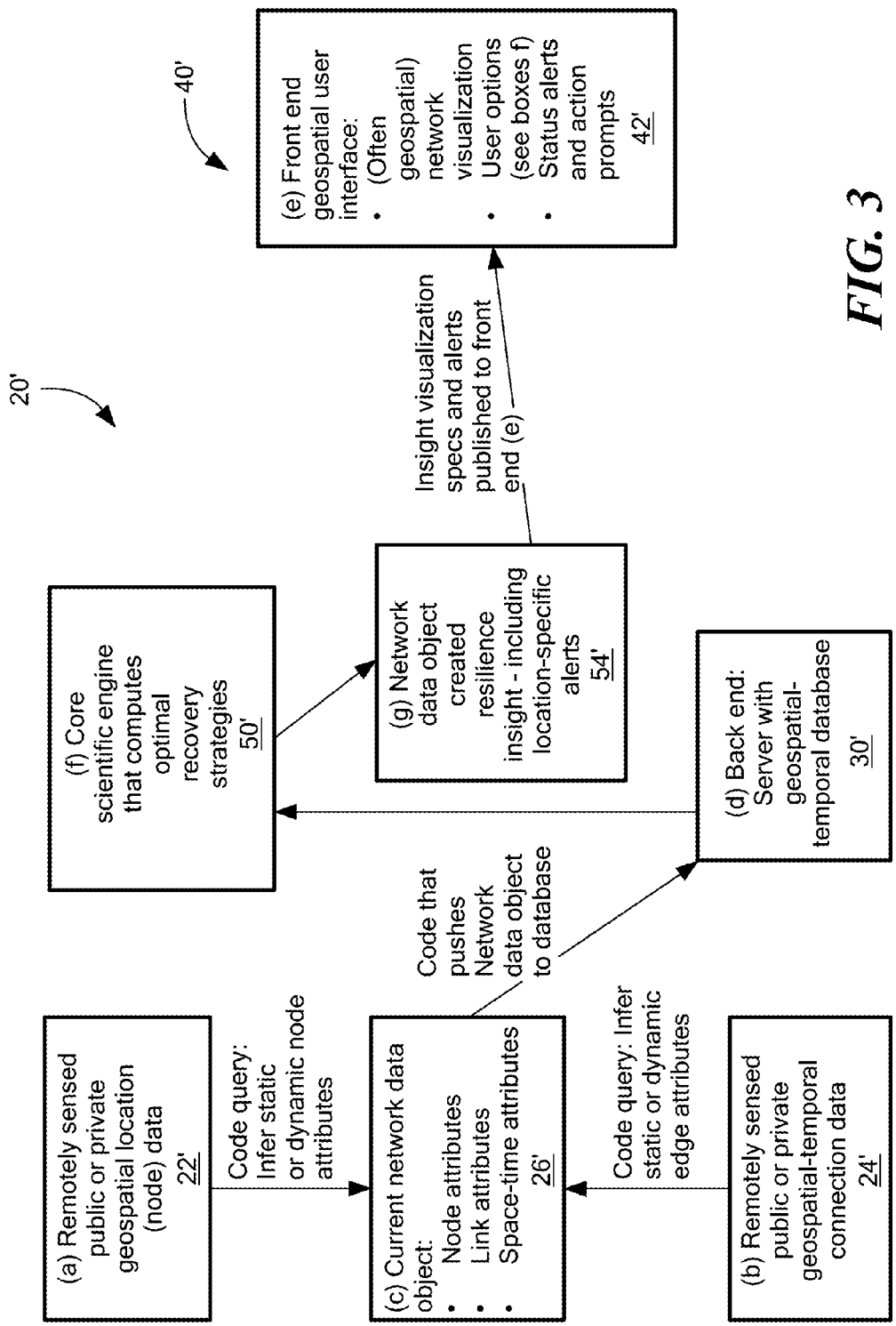
FIG. 3 is a schematic block diagram of an embodiment of a method and system for determining a real-time or near real-time optimal recovery strategy in response to a hazard.

FIG. 3 illustrates an embodiment of the method and system that can be used as a near-real time or real time decision support tool for managing a network in any state of functionality. This embodiment can help a manager take actions to support network-wide resilience at any given state. FIG. 3 can differ from FIG. 1 within objects 22, 24, 26. Rather than an occasional external query, codes can be provided to query external remote sensors at each node and link of the network to quantify their status. That status is converted to a current network data object 26' and then stored retrospectively in the backend database 30'. This embodiment is useful where the total network is well defined and the method and system can be used for efficient network-wide real time hazard response and recovery. In light of that, user-specifiable options can be reduced or eliminated. Instead, if the status of one or more sensors changes, this change can inform a network-wide, optimal recovery strategy, which can provide an alert and an update of the strategies to the user interface 40'. In some embodiments, if a local user that is a component of a larger network needs to take action based on the optimal strategy, the local user can receive an alert, potentially with specific recommended actions, which are created in a network data object 54', determined from strategies computed in the scientific engine 50', and conveyed through user interface 42', 40'. In some embodiments, a centralized decision maker can use the planning engine shown in FIG. 1 to build the reactive module shown in FIG. 3. The user interface for this reactive module can be similar to that shown in FIG. 2, without many or any customization options.

Figure 4:
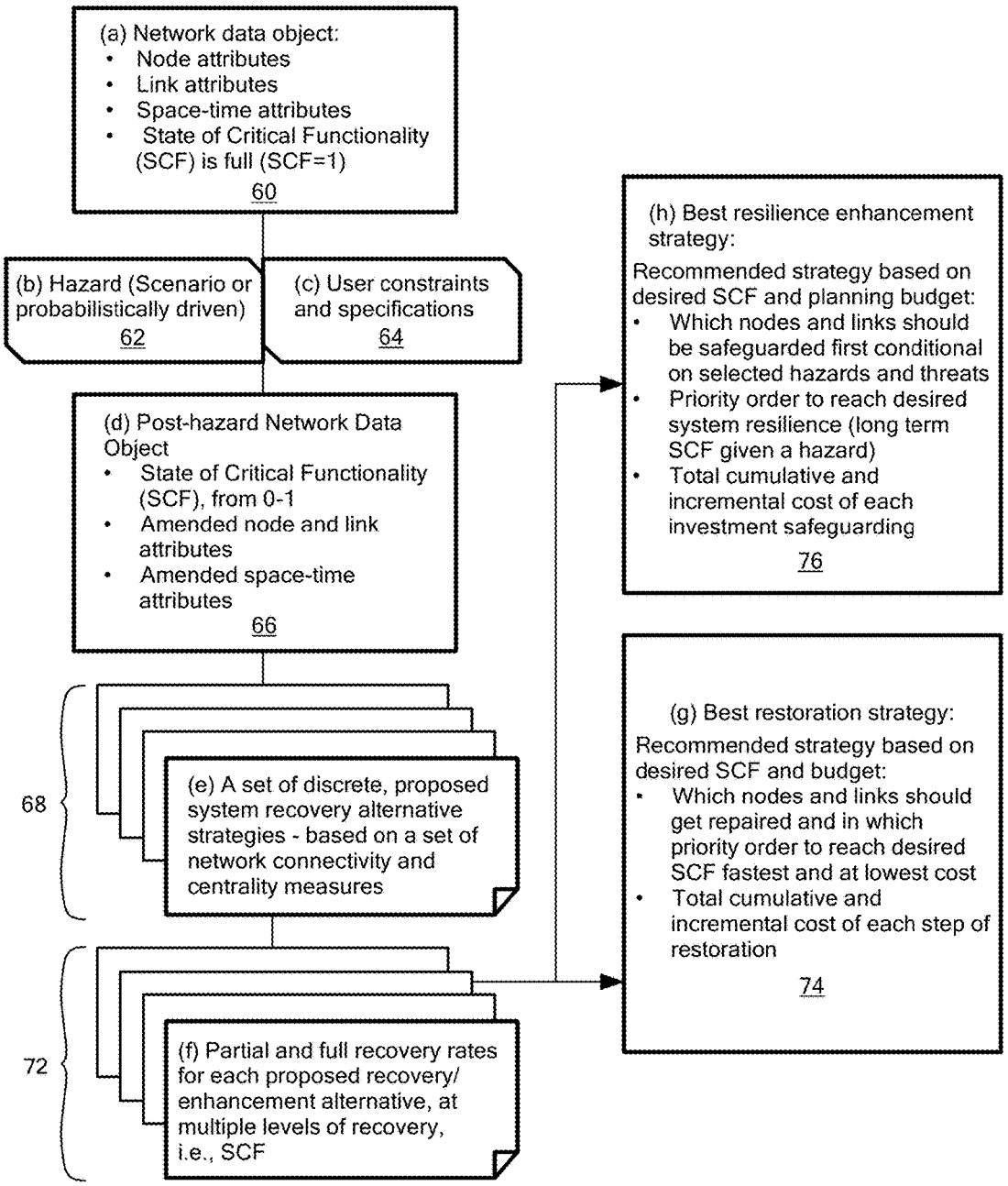
FIG. 4 is a schematic block diagram of an embodiment of a scientific engine for determining one or more recovery strategies of a network.

The core scientific engine 50, 50', shown in FIGS. 1 and 3, is described with more particularity by reference to FIG. 4. A network data object 60 captures the system of interest at its full State of Critical Functionality, a metric that ranges from 0-1. At Full Functionality (FF), SCF=1. SCF can be computed by evaluating the currently largest cluster, or largest connected set of nodes in the network, (PF=Partial Functionality) divided by the largest cluster at FF. Thus, SCF=PF/FF, ranging between 0 and 1. When the network is at full functionality, that is the special case where PF=FF and so SCF=1. The SCF quantifies the system's ability to perform at full functionality and provides a measuring stick to quantify and compare any suboptimal state of partial functionality. Given a hazard 62 and potentially user specifications (64, see also FIGS. 1-2), then data object 66 captures the post-hazard description of the network, and importantly its SCF. Its SCF is an indicator of the current, post-hazard "health," or relative functionality, of the network. Given the post-hazard network data in data object 66, a set of recovery strategies 68 can be proposed. Those recovery strategies are based on computing a variety of metrics over each node and/or link of the network, which can include but may not be limited to: degree (the number of connections any node has), centrality (the degree to which a node serves as a bridge between other nodes), and volume of traffic that passes through a node. The alternative strategies quickly analyze recovery strategies that use those metrics as a way to prioritize the repair of those nodes or links. Subsequently, in object 72, the conditional partial and/or full rates of recovery under each proposed strategy are evaluated, including under any potential user given constraints. For example, if a user needs or wants to achieve a 50% system functionality, or SCF=0.5, the system can evaluate, according to different metrics, which recovery strategy is the fastest and least expensive node-prioritization scheme to get the network to SCF=0.5. The optimal recovery strategy from 72 can be captured in object 74 and can be displayed to a user. Similarly, a planning module, object 76, can be provided in which a user can evaluate the optimal prioritization of nodes that should be enhanced to ensure future resilience under scenarios of plausible future hazards. Object 76 can use SCF as the metric for measuring the effectiveness of any such adaptation strategy. The difference between objects 74 and 76 lies within the goals of the workflow: in 74 a user is trying to analyze the system as it currently is to quantify the best strategy. In 76 the user is trying to improve the system to ensure optimal response to a future plausible hazard.

More particularly, the scientific engine utilizes a metric termed herein the State of Critical Functionality (SCF) to measure the functionality of the system. The engine also utilizes the largest connected set (sometimes called the "giant component") of nodes in the network. (For example, in a railway network, that would mean that a person could travel from any station i to any other station j by at least one path, perhaps with stops at interim stations.) Total Functionality (TF) is the number of nodes in the giant component when the network is completely functional. For example, for a railway network, the giant component could be the total number of connected railway stations. Fragmented Functionality (FE) is the number of nodes in the largest connected set at any given step, wherein one or more nodes are incapacitated by disruptions. The State of Critical Functionality (SCF) can be then defined as:

$$SCF=FF/TF.$$

Thus, SCF is effectively a measurement of critical functionality at any step normalized between 0 and 1.

In operation to identify a prioritization sequence, the SCF is computed at the initial post-hazard state of the network. The prioritization sequence is the order in which nodes should regain their full functionality starting from the initial post-hazard state. For example, restoring the node A to full functionality requires restoring all edges connected to the node and partially activating the nodes which are one step from node A. Nodes that are partially activated may not have full functionality, since for these nodes, only the edges that directly lead to fully functional nodes are recovered. This sequence can be generated randomly, through intuitive, common sense metrics, or through other statistical or network science metrics.

Given a sequence, iteratively, until SCF=1:
 a. The next node in the prioritization sequence is restored to full functionality, re-establishing the traffic flow between this node and the nodes to which it is connected. This grows the giant component.
 b. FF is recalculated.
 c. SCF is recalculated.

The determination of a recovery sequence is described with more particularity as follows:
 (1) Set SCF=1

(2) Set TF=total number of connected nodes in current network (where SCF=1)
(3) Remove nodes $X_P$ from X, where X represents all nodes and P represents the subset of nodes impacted by a hypothetical disruption. Removing nodes $X_P$ also removes the connections between any node within $X_P$ and any other node.
(4) Multiple recovery prioritization sequences are identified. The following are examples of some sequence-generating functions. It will be appreciated that other sequence-generation functions can be used.
 a. Degree, k, where degree is defined as the number of connections a node has. This sequence is in descending order of degree.
 b. Clustering coefficient of node i:

$$CC_i = 2*E_i/(k_i*(k_i-1)),$$

where $E_i$ is the number of links that exist between the $k_i$ nodes that $X_i$ is linked to. (For example, how many of my friends are friends with each other?) This sequence is in descending order of the clustering coefficient.
 c. Betweenness Centrality of node i:

$$B_i = \sum_{s \ne i \ne t} \frac{\sigma_{st}(i)}{\sigma_{st}}$$

where $\sigma_{st}$ is the total number of shortest paths from nodes s and t and $\sigma_{st}(i)$ is the subset of $\sigma_{st}$ that pass through node i. (This is the extent to which node i acts as a key bridge between other nodes). This sequence is in descending order of betweenness centrality.
 d. Closeness Centrality of node i:

$$C_i = \frac{1}{\sum_y d(y, i)}$$

where d(y,i) is the distance (number of network steps) between nodes i and y. (So, the smaller the number of steps, the more 'central' the node is to the overall network.)
 e. Eigenvector Centrality of node i:

$$EV_i = \frac{1}{\lambda} \sum_{t \in M(i)} EV_t = \frac{1}{\lambda} \sum_{t \in G} a_{i,t} EV_t$$

where M(i) is the set of nodes connected to node i and $\lambda$ is a constant (an eigenvalue) identified via a matrix computation. In simpler terms, the eigenvector centrality of node i is the sum of the centrality values of each node it is linked to—implying that more "important" nodes are more likely to be connected to other nodes that are "important" ("important" in this case meaning highly connected.) In the above, $a_{i,t}=1$ if node i is connected to node t and $a_{i,t}=0$ if it is not. G is the entire possible set of nodes; M(i) is the subset of nodes connected to node i, so $$\frac{1}{\lambda} \sum_{t \in M(i)} EV_t$$

is the same as $$\frac{1}{\lambda} \sum_{t \in G} a_{i,t} EV_t,$$

just stated differently. In the latter equation, $a_{i,t}$ is needed, because the equation is not restricted to considering nodes connected to i. In summary, these two summations are the same. Eigenvector centrality is computed for each node and ranges from largest to smallest.

(5) For each sequence SEQ listed in step 4:
  f. Set $STEPS_{SEQ}=0$
  g. For each node in SEQ:
    i. Add node back to network and restore each of its connections
    ii. Calculate SCF=FF/TF, where FF=total number of connected nodes in current network
    iii. Stop when SCF=1
    iv. Increment $STEPS_{SEQ}$ by 1
(6) Holding all else constant, the optimal recovery strategy is that SEQ which achieves SCF=1 (or another desired value between 0 and 1) with the smallest $STEPS_{SEQ}$.

Figure 6:
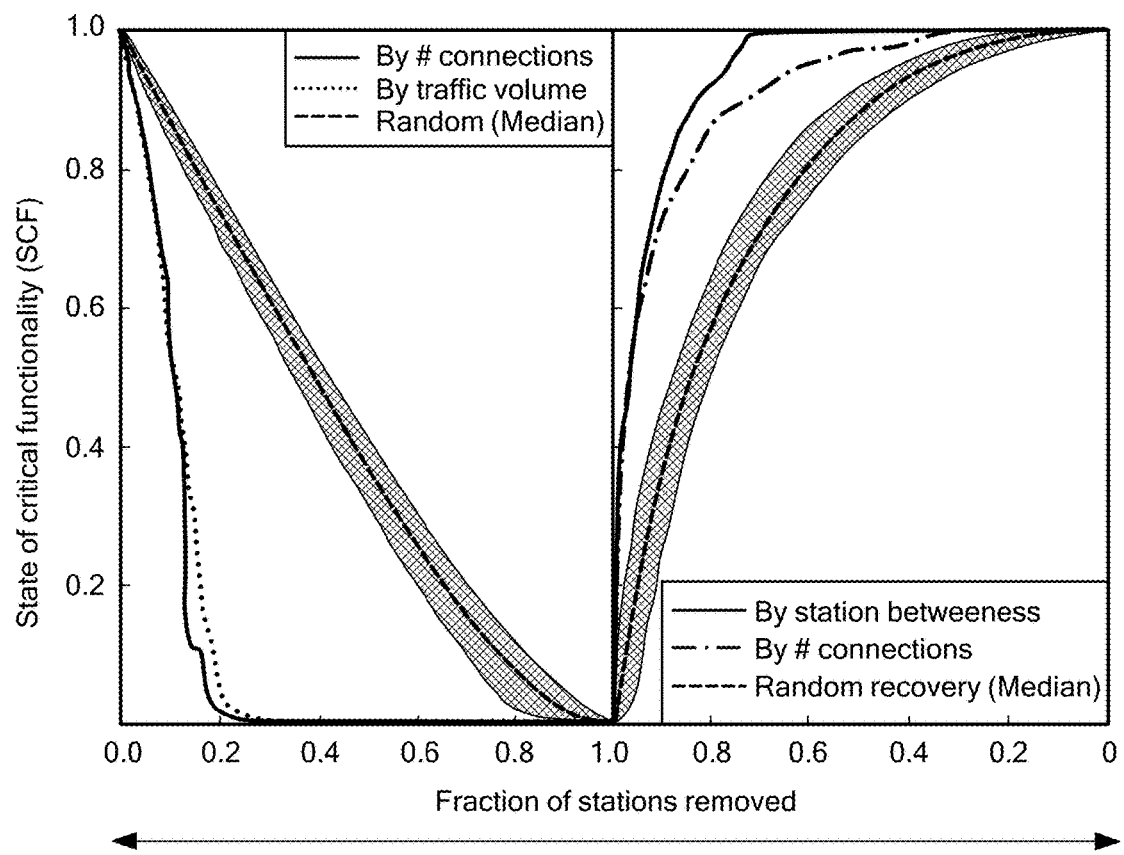
FIG. 6 is a topological diagram of the Indian Railway Network.

The efficiency of each recovery sequence can also be measured by computing its corresponding impact area (IA), which is defined as the area between the recovery curve and the y-axis representing SCF (see FIG. 2 or 6). Hence, a smaller IA indicates a more efficient recovery strategy.

Figure 5:
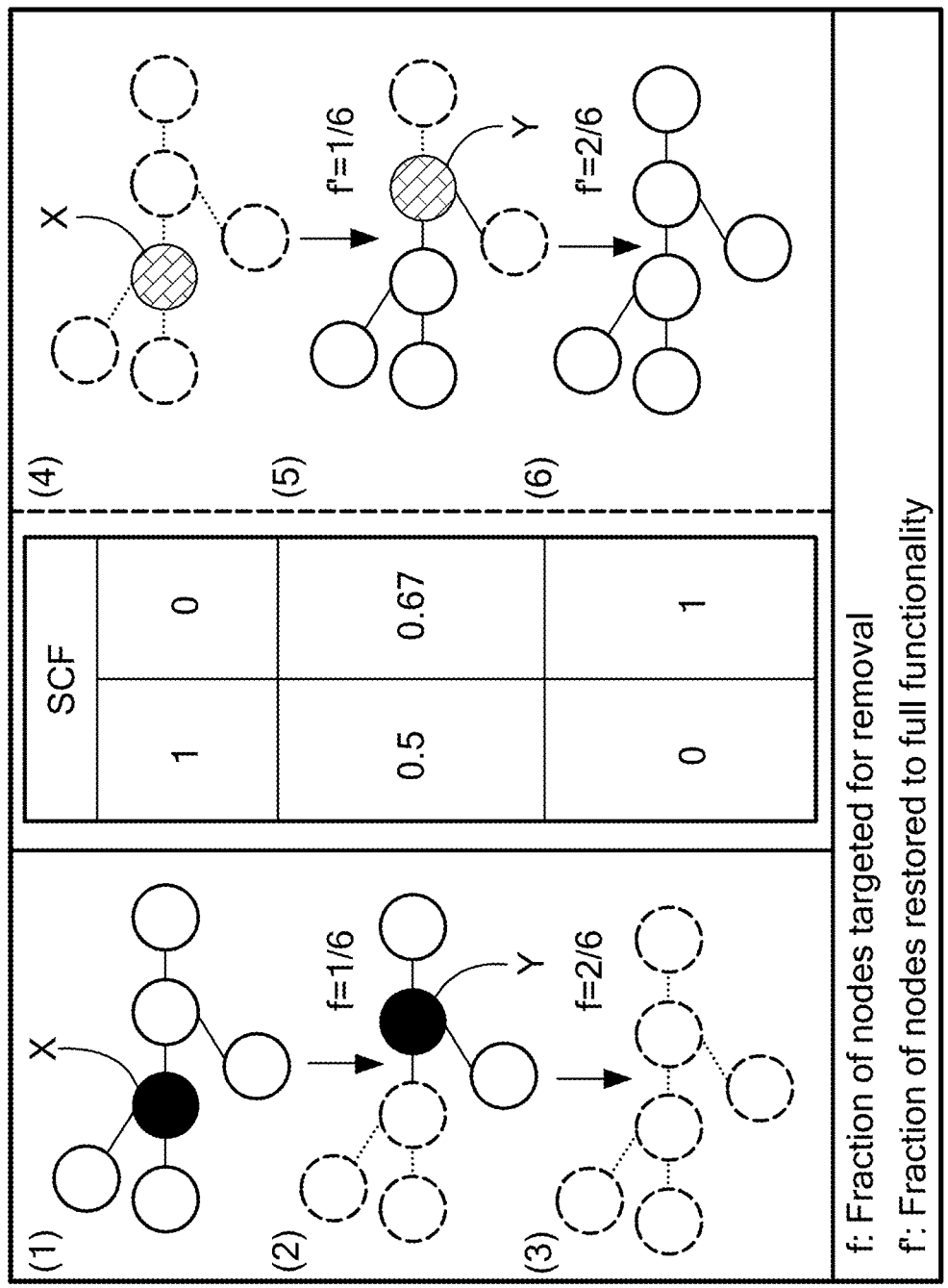
FIG. 5 illustrates a simplified example of a disruption process followed by a recovery process.

FIG. 5 illustrates a simplified example of a disruption process followed by a recovery process according to the present system and method. Two nodes X and Y are selected randomly for removal at time T=1 and T=2, respectively.

(1) The SCF=1 at step T=0 (pre-hazard). Node X (black in subpanel (1) on the left) is selected for removal at step T=1.

(2) Removal of node X results in reduction of the size of the Giant Component (GC), which sets SCF=0.5. Dashed nodes (edges) are the nodes (edges) that get detached from the GC and hence incapacitated. Node Y (black in subpanel (2)) is selected for removal at step T=2 (f=⅙, meaning one out of the six nodes is targeted for removal).

(3) The GC ceases to exist after the removal of node Y. All nodes are shown in dashed lines in subpanel (3). SCF=0.

To highlight the asymmetric nature of the recovery process, nodes are restored to their full functionality in the same order these were removed (i.e. node X followed by node Y) from the network.

(4) Node X (brick pattern in subpanel (4) on the right) is selected for restoration to full functionality in the first step of the recovery process.

(5) This results in the recovery of the node X to full functionality (f=⅙, meaning one out of the six nodes is fully functional). As a result, three nodes directly connected to X gain at least one edge and the GC grows, making SCF=0.67. Then, node Y (brick pattern in subpanel 5) is selected for recovery in step (6).

(6) Recovery of node Y to its full functionality results in restoration of the SCF of the network to 1 as shown in subpanel (6).

The method and system for recovering a network from a state of disruption to a state of partial or complete functionality as described herein can be implemented as or can include a computing device that includes a combination of hardware, software, and firmware that allows the computing device to run an applications layer or otherwise perform various processing tasks. Computing devices can include without limitation personal computers, work stations, servers, laptop computers, tablet computers, mobile devices, hand-held devices, wireless devices, smartphones, wearable devices, embedded devices, microprocessor-based devices, microcontroller-based devices, programmable consumer electronics, mini-computers, main frame computers, and the like.

The computing device can include a basic input/output system (BIOS) and an operating system as software to manage hardware components, coordinate the interface between hardware and software, and manage basic operations such as start up. The computing device can include one or more processors and memory that cooperate with the operating system to provide basic functionality for the computing device. The operating system provides support functionality for the applications layer and other processing tasks. The computing device can include a system bus or other bus (such as memory bus, local bus, peripheral bus, and the like) for providing communication between the various hardware, software, and firmware components and with any external devices. Any type of architecture or infrastructure that allows the components to communicate and interact with each other can be used.

Processing tasks can be carried out by one or more processors. Various types of processing technology can be used, including a single processor or multiple processors, a central processing unit (CPU), multicore processors, parallel processors, or distributed processors. Additional specialized processing resources such as graphics (e.g., a graphics processing unit or GPU), video, multimedia, or mathematical processing capabilities can be provided to perform certain processing tasks. Processing tasks can be implemented with computer-executable instructions, such as application programs or other program modules, executed by the computing device. Application programs and program modules can include routines, subroutines, programs, drivers, objects, components, data structures, and the like that perform particular tasks or operate on data.

The computing device includes memory or storage, which can be accessed by the system bus or in any other manner. Memory can store control logic, instructions, and/or data. Memory can include transitory memory, such as cache memory, random access memory (RAM), static random access memory (SRAM), main memory, dynamic random access memory (DRAM), and memristor memory cells. Memory can include storage for firmware or microcode, such as programmable read only memory (PROM) and erasable programmable read only memory (EPROM). Memory can include non-transitory or nonvolatile or persistent memory such as read only memory (ROM), hard disk drives, optical storage devices, compact disc drives, flash drives, floppy disk drives, magnetic tape drives, memory chips, and memristor memory cells. Non-transitory memory can be provided on a removable storage device. A computer-readable medium can include any physical medium that is capable of encoding instructions and/or storing data that can be subsequently used by a processor to implement embodiments of the method and system described herein. Physical media can include floppy discs, optical discs, CDs, mini-CDs, DVDs, HD-DVDs, Blu-ray discs, hard drives, tape drives, flash memory, or memory chips. Any other type of tangible, non-transitory storage that can provide instructions and/or data to a processor can be used in these embodiments.

The computing device can include one or more input/output interfaces for connecting input and output devices to various other components of the computing device. Input and output devices can include, without limitation, keyboards, mice, joysticks, microphones, displays, monitors, scanners, speakers, and printers. Interfaces can include universal serial bus (USB) ports, serial ports, parallel ports, game ports, and the like.

The backend and front end can be implemented on a single computing device or can be implemented on distributed computing devices in communication over any suitable communication network. The computing device or devices can access a network over a network connection that provides the computing device(s) with telecommunications capabilities. Network connection enables the computing device(s) to communicate and interact with any combination of remote devices, remote networks, and remote entities via a communications link. The communications link can be any type of communication link, including without limitation a wired or wireless link. For example, the network connection can allow the computing device to communicate with remote devices over a network, which can be a wired and/or a wireless network, and which can include any combination of intranet, local area networks (LANs), enterprise-wide networks, medium area networks, wide area networks (WANs), the Internet, cellular networks, and the like. Control logic and/or data can be transmitted to and from the computing device via the network connection. The network connection can include a modem, a network interface (such as an Ethernet card), a communication port, a PCMCIA slot and card, or the like to enable transmission of and receipt of data via the communications link.

The computing device can include a browser and a display that allow a user to browse and view pages or other content served by a web server over the communications link. A web server, server, and database can be located at the same or at different locations and can be part of the same computing device, different computing devices, or distributed across a network. A data center can be located at a remote location and accessed by the computing device over a network.

The computer system can include architecture distributed over one or more networks, such as, for example, a cloud computing architecture. Cloud computing includes without limitation distributed network architectures for providing, for example, software as a service (SaaS), infrastructure as a service (IaaS), platform as a service (PaaS), network as a service (NaaS), data as a service (DaaS), database as a service (DBaaS), backend as a service (BaaS), test environment as a service (TEaaS), API as a service (APIaaS), and integration platform as a service (IPaaS).

Example

Figure 7:
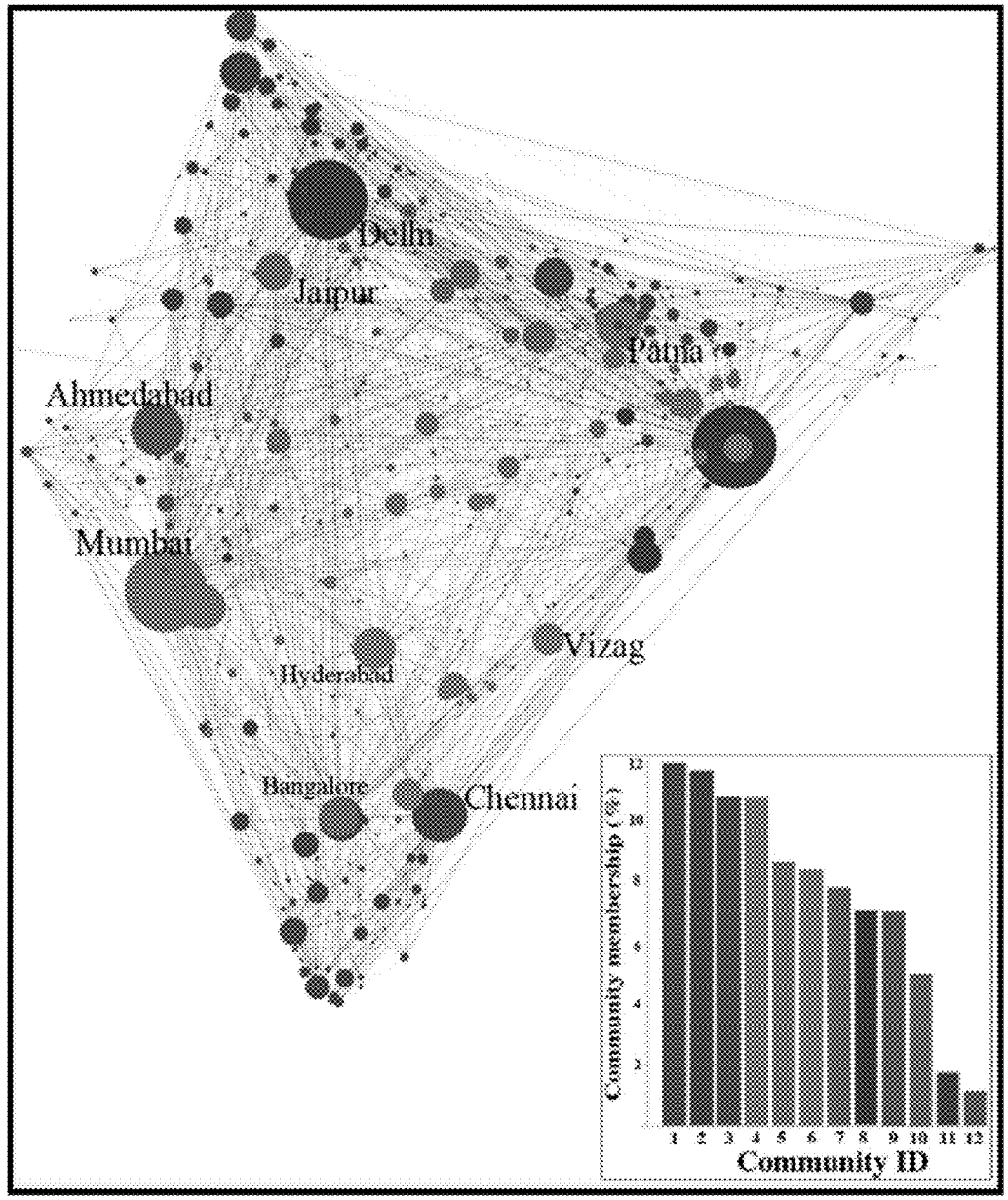
FIG. 7 is an embodiment of a graphical representation of determined recovery strategies.
Figure 8:
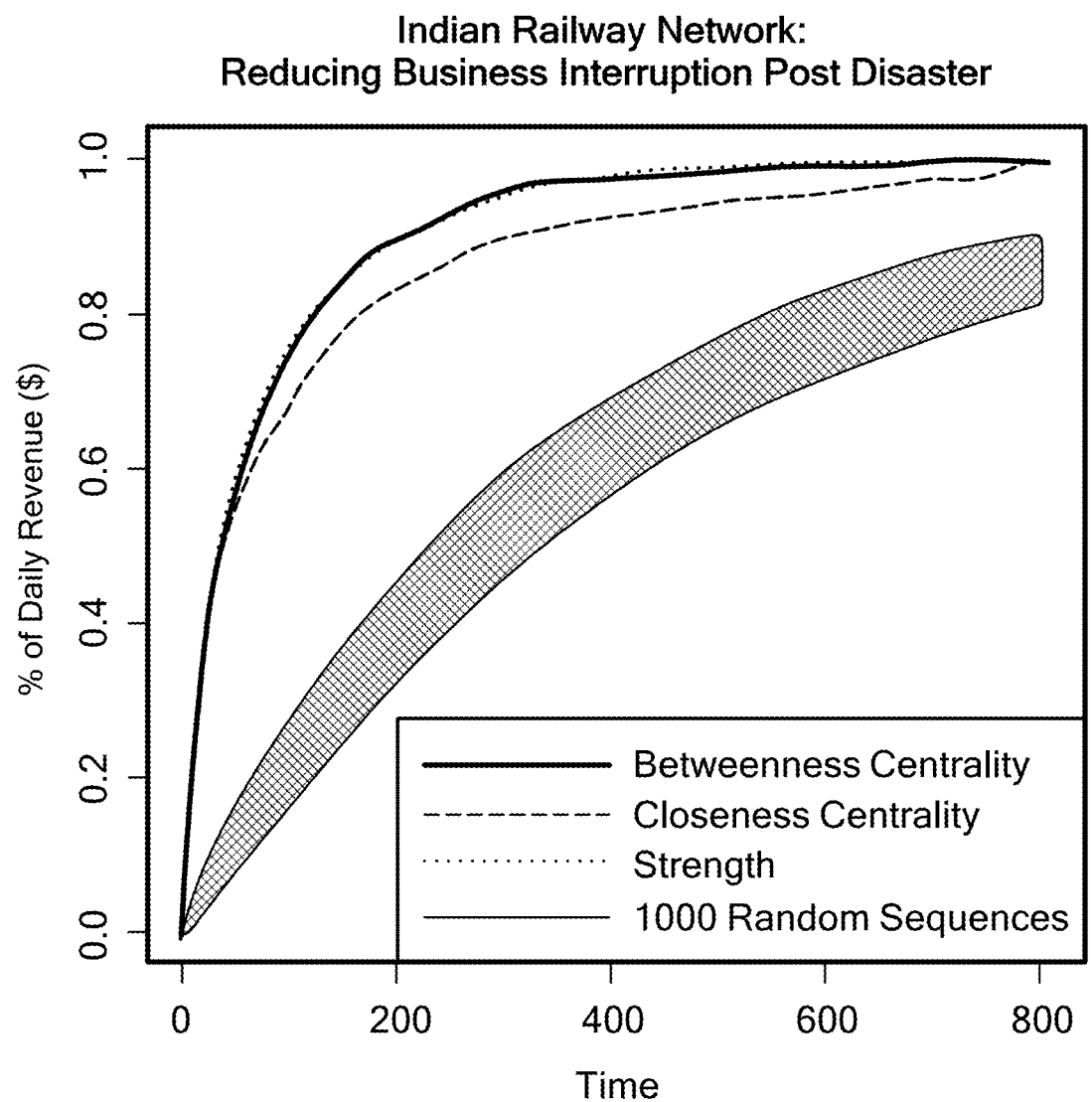
FIG. 8 is a graphical representation of a quantification of revenue recovered under various recovery sequences.

FIGS. 6-8 illustrate a disruption to and then recovery of a network using the Indian Railway Network (IRN) as an example. FIG. 7 is an illustration of the lifeline network at issue in this example. FIG. 6 shows disruptions (decreasing curves on the left) and then recovery sequences (increasing lines on the right). Thus, the right panel illustrates the present recovery system and method. Each line shows the increase in the SCF under different node prioritization sequences. Each sequence was generated by a different strategy. The gray envelope captures 1,000 random strategies as a baseline—if nodes are restored in a completely random order, how fast will SCF increase? The other different styled lines are recovery trajectories based on recovery sequences that are generated by specific metrics: betweenness centrality (solid line), degree (dashed-dotted line), and randomly (dashed line and grey envelope), as described above. For instance, the dashed-dotted line is where nodes (stations in this case) are recovered in descending order of how many links each node has—the more links a node has, the earlier it is recovered. In this particular case, betweenness centrality turns out to be the best recovery sequence. Thus, the recovery method provides for the generation of different recovery sequences to see which ones restore the lifeline network fastest/most efficiently.

The IRN network database was constructed using publicly available data (from open source databases of express and local passenger trains in India (at indianrail.gov.in, indianrailways.in) and an e-ticket booking company (at ixigo.com)) that was cleaned and appropriately formatted. The IRN was modeled as an origin-destination network. Stations with at least one originating or terminating train, comprising 752 out of a total of 809 stations, were considered. Thus, 752 stations make up the giant component (the largest connected group of stations). Accordingly, total functionality TF=752.

Each station's degree, or connectivity, is measured by the number of connections it has with other stations. Each station's strength is measured by its total traffic volume in terms of the total number of trains that originate or terminate at that station. Strength is defined this way with the hypothesis that traffic volume can be a useful metric for understanding failure and/or for prioritizing stations during recovery. Two stations i and j are considered to be connected by an edge if there exists a train between the pair of stations such that a train originating at i terminates at j. Elements of the adjacency matrix $\{a_{ij}\}$ are 1 if the train originating from station i terminates at station j and 0 otherwise. The weight of an edge is calculated as the number of trains running between a pair of stations in either direction. Thus, any element of the weighted adjacency matrix $\{wij\}$ is the number of trains originating from station i and terminating at station j. The connections were almost all bidirectional; specifically, the numbers of trains connecting pairs of stations in one direction were different from the other directions in less than 250 out of the 654,481 possible cases (less than 0.04% of cases). The traffic flow matrix could therefore be made symmetric without much distortion of the network by selecting the larger non-zero value per station pair. Hence, the IRN is analyzed as an undirected weighted network. To understand the structure of IRN, the degree and strength distribution of the stations are calculated. The cumulative degree distribution P(k>K) gives the probability that a station has more than K connections to other stations and is defined as:

$$P(k>K)=1-\Sigma_{k=k_{min}}^{K}p(k)$$

where p(k) is number of stations having degree k divided by total number of stations and $k_{min}$ is the minimum degree found over all nodes in the network. Similarly, cumulative distribution of strength P(S>s) gives the probability that a station has more than S originating (or terminating) trains, i.e., traffic volume. The cumulative degree and strength distributions follow truncated power law models. Most stations have a small number of connections, with the exception of several hubs that are generally related to major metropolitan areas as well as geospatially isolated from each other.

The modularity-based Louvain community detection algorithm is used to characterize the topology of the IRN. The weighted adjacency matrix defined earlier is used as the input for the community detection. The topology of the network can provide interpretation for the IRN's robustness to and recovery from different types and geographical origins of hazards.

Results indicate that recovery strategies do not necessarily follow the sequence in which the nodes were damaged during network collapse. FIG. 6 translates the formerly conceptual hazard response curves into quantitative terms, with the IRN functionality degrading owing to either targeted station removal or random failures (e.g., potentially from random but typical service disruptions, shown by dashed line on left side panel). The targeted station removals may be caused by targeted attacks that prioritize the stations to be taken down by connectivity or degree (solid line on left side panel), or by traffic volume or strength (dotted line on left side panel). Network robustness computations applied to the IRN suggest that while random failures would need to eliminate 95% of the stations for near complete loss of functionality, the corresponding numbers are 25% for targeted attacks by number of connections and 23% for targeted attacks by traffic volume.

In the right panel of FIG. 6, recovery strategies are compared for the case where the IRN starts at a SCF=0, i.e., completely unconnected and dysfunctional. The optimum recovery strategy can be defined in terms of resources required and/or time taken for partial or full recovery of functionality. The metric SCF is used as a proxy for those resources or time. Three types of recovery alternatives are evaluated. First, N=1000 random sequences serves as a baseline for comparison (dashed line on right panel). The second set of strategies, perhaps the most immediately intuitive, is based on station attributes including connectivity and traffic volume. For simplicity, one strategy of the second set, number of connections, is illustrated in FIG. 6 (dash-dot line on right panel). The third set of strategies is based on network centrality measures, such as eigenvector (by average importance of connected stations), closeness (by average proximity to other stations, in a network connectivity but not necessarily a geographic sense), and betweenness (by the average number of times any passenger traveling between origin-destination station pairs needs to go through the station under consideration). For simplicity, one strategy of the third set, station betweenness, is illustrated in FIG. 6 (solid line on right panel).

As noted above, the efficiency of each recovery sequence can be measured by computing the impact area IA, the area between the recovery curve and the y-axis representing SCF. In this case, IRN recovery is most efficient at most stages of partial or full recovery when betweenness centrality is chosen for generating a recovery sequence. On average, random recovery sequences require resources (calculated as the impact area, averaged over the N=1000 random sequences) in excess of 250% compared with the betweenness centrality-based sequence. Recovery based on the connectivity (degree) sequence requires resources in excess of 67% compared to betweenness centrality. The interpretation for the performance of betweenness centrality in this case is discussed further below.

The present method and system can also be used for communities within a network. For example, the IRN has a number of relatively independent communities. The two largest communities were considered separately and analyzed. For full recovery of the IRN, betweenness centrality was determined to be the most efficient strategy. However, at some stages of partial recovery, the most efficient metric may not be the same as for the full network. For example, for a community spanning South India, closeness centrality generates a particularly suboptimal sequence. This is a likely consequence of the fact that there are many geospatially proximal stations in this region that are not connected to many others. In both communities analyzed (South and North India), betweenness centrality ultimately emerges as the best metric for prioritizing stations for full recovery of the IRN or the vast majority of its functionality. The results suggest that the framework generalizes but that the choice of the most appropriate recovery strategy may depend on the network, the community, or the desired state of recovery (i.e., level of desired SCF).

In some cases, the network recovery process may not need to begin from a state of complete disrepair (i.e., at SCF=0). This motivates testing the utility of the framework on exemplary set of realistic hazards that only partially incapacitate the IRN.

Accordingly, the recovery portion of the framework subject to three specific hazards was also examined. First, a simulation inspired by the 2004 Indian Ocean tsunami removes 9% of stations on the southeastern Indian coast. Second, a scenario was simulated based on a cascade from the power grid, similar to the fallout from the historically massive 2012 blackout. Third, a hypothetical cyber or cyber-physical attack scenario was simulated, where the stations are perhaps maliciously targeted based on traffic volume the network structure is fractured significantly. Cyber-physical terror attacks may be region-specific, but the possibility of coordinated attacks exists, especially for cyber. The post hazard SCF values are 0.903, 0.852, and 0.890 (679, 641, and 669 nodes remaining in the giant component) respectively for the three hazards, and recovery begins from these starting points.

An ensemble of N=1000 members of random sequences are used in each case as a baseline. All metrics lead to recovery sequences that are almost always more effective than the random sequences. It is less clear which metrics lead to the most effective recovery sequences in general. In all three cases, a choice of betweenness centrality leads to total functionality (SCF=1) earliest, although at earlier stages other metrics are at times preferable.

An example using data from the IRN to illustrate a quantifiable gain in revenue from several recovery sequences is described with reference to FIG. 8. This figure illustrates the percentage recovery of daily revenues generated by the IRN for several recovery sequences. The shaded bounds designate 1000 random recovery sequences. Also shown are strength, betweenness centrality, and closeness centrality. The horizontal axis is time or recovery steps, and the vertical axis assumes that each "trip," a train going from a node to a node, generates $10,000.00 in revenue per day, based on actual data from the IRN. It will be appreciated that the actual value is not significant, because the analysis can determine percentages. At full functionality, the IRN generates 100% of the revenue that it should. Then, assume the network is fully disrupted and recovered using the various recovery sequences. The number of trips (from node to node) is measured at each state of recovery and divided by the number of trips on the entire IRN at full functionality (hence, the number is always between 0 and 1).

This study presents a complex network-based unified framework that goes beyond fragility characterization and conceptual resilience curves to offer data-driven, quantitative insights for decision-making before, during and after hazards to enable preparedness, relief and recovery. While the fragility characterization may be considered an adaptation of existing network science methods, recovery curves are new and can generalize to other applications. The framework developed here allows for generation and performance comparison of multiple node recovery sequences, allowing for the possibility that different networks should be recovered according to sequences generated from different metrics. The recovery differs from a straightforward application of percolation theory in that the sequence of node recovery does not necessarily follow the sequence in which they were damaged during network collapse. The recovery of a node accompanies the recovery of the links and hence traffic flow to directly connected nodes.

As used herein, "consisting essentially of" allows the inclusion of materials or steps that do not materially affect the basic and novel characteristics of the claim. Any recitation herein of the term "comprising," particularly in a description of components of a composition or in a description of elements of a device, can be exchanged with "consisting essentially of" or "consisting of."

It will be appreciated that the various features of the embodiments described herein can be combined in a variety of ways. For example, a feature described in conjunction with one embodiment may be included in another embodiment even if not explicitly described in conjunction with that embodiment.

The present invention has been described in conjunction with certain preferred embodiments. It is to be understood that the invention is not limited to the exact details of construction, operation, exact materials or embodiments shown and described, and that various modifications, substitutions of equivalents, alterations to the compositions, and other changes to the embodiments disclosed herein will be apparent to one of skill in the art.

What is claimed is:

1. A method for providing a recovery sequence for a network from a state of disruption to a state of partial or complete functionality, the network comprising a plurality of nodes interconnected by links, the network subject to disruption that removes from the network one or more nodes, one or more links, or a combination of one or more nodes and one or more links, wherein a disrupted node is a node through which traffic cannot flow and a functional node is a node through which traffic can flow, the method comprising:

providing a backend computing device comprising one or more processors and memory, and a user interface in communication with the backend computing device;

storing, in a database in the memory, data comprising identities of the nodes and the links of the network, attributes of the nodes, and attributes of the links;

receiving user preference data from a user at the user interface, the user preference data including a state of desired functionality, and one or more of a type of hazard, severity of hazard, location of hazard, resilience budget, and cost of node or link repair;

receiving, at the backend computing device, an identification of a plurality of the nodes as disrupted nodes;

determining, by a scientific engine comprising instructions stored in the memory for execution by the one or more processors, a priority recovery sequence by which disrupted nodes are to be restored to the state of desired functionality, wherein determining the priority recovery sequence comprises:

determining a giant component of the nodes, the giant component comprising a largest connected set of nodes; and determining an initial value of a state of critical functionality (SCF), the SCF ranging from 0 to 1 and comprising a fragmented functionality (FF) divided by a total functionality (TF), wherein:

FF is a number of functional nodes in the giant component at a determined time, and TF is a total number of nodes in the giant component when the network is fully functional; and simulating restoration of the disrupted nodes one by one to functionality until a desired value of SCF is obtained; and providing to the user interface a priority recovery sequence to restore the network to the desired state of functionality.

2. The method of claim 1, wherein storing data comprises one or more of:

(a) populating a network data object with the data comprising the identities of the nodes and the links of the network, the attributes of the nodes, and the attributes of the links, and pushing the network data object to the database stored in the memory;

(b) augmenting or overriding the data in the network data object in the database with a further data input by a user at the user interface; and (c) querying node and link data to refresh the node and link data, and pushing an updated network data object to the database.

3. The method of claim 2, wherein step (c) comprises querying the node and link data on a periodic schedule.

4. The method of claim 1, wherein identifying the nodes as disrupted nodes comprises receiving an input from an external computing device, from sensors located at the nodes, or from the user interface comprising identities of disrupted nodes or links.

5. The method of claim 1, further comprising:

receiving from a sensor located at a disrupted node data indicating that the disrupted node has been restored to functionality;

updating, by the scientific engine, the priority recovery sequence; and providing the updated priority recovery sequence to the user interface.

6. The method of claim 1, wherein providing the priority recovery sequence to the user interface comprises transmitting a graphical display to the user interface comprising a graph illustrating a fraction of disrupted nodes vs. a state of critical functionality for one or a plurality of recovery sequences.

7. The method of claim 6, further comprising transmitting a graphical display to the user interface comprising a graph illustrating a fraction of disrupted nodes vs. a state of critical functionality for a variety of hazard scenarios.

8. The method of claim 1, further comprising providing to the user interface one or more metrics comprising financial savings, prevented down time of the network, prevented temporal business interruption, prevented socioeconomic damage, prevented disease spread, mitigated transportation losses in terms of traffic volume not delayed, prevented downtime in power supply from a blackout or brownout, prevented Internet downtime, or prevented natural ecosystem losses that result from alternative proposed recovery sequences.

9. The method of claim 1, wherein the user interface is provided on an external computing device.

10. The method of claim 1, wherein simulating restoration of a disrupted node comprises adding the disrupted node and the connections of the disrupted node to its neighboring nodes back to the network.

11. The method of claim 1, wherein determining a priority recovery sequence comprises:
   (a) determining a first SCF value after disruption;
   (b) simulating restoration of one of the disrupted nodes to full functionality;
   (c) calculating a number of functional nodes in the giant component;
   (d) determining a further SCF value; and
   (e) repeating steps (b) through (d) until a desired SCF value is reached.

12. The method of claim 1, further comprising weighting the attributes of the nodes and the attributes of the links, and determining the desired SCF value using the weighted attributes.

13. The method of claim 1, wherein the step of receiving an input of a disruption further comprises identifying links between any disrupted node and a neighboring node.

14. The method of claim 1, wherein determining a priority recovery sequence comprises determining multiple recovery sequences and comparing the multiple recovery sequences to determine the priority recovery sequence.

15. The method of claim 14, wherein the determined recovery sequence comprises one or more of:
   (a) a sequence in which a desired SCF value can be achieved in a fastest time,
   (b) a sequence in which a desired SCF value can be achieved with a fewest number of steps,
   (c) placing the disrupted nodes in order by degree, wherein degree comprises a number of links to a node, and simulating restoration of the disrupted nodes to functionality, in order from largest degree to smallest degree, until a desired value of SCF is obtained;
   (d) placing the disrupted nodes in order by clustering coefficient, wherein the clustering coefficient is proportional to a number of links to nodes to which a disrupted node is linked, and simulating restoration of the disrupted nodes to functionality, in order from largest clustering coefficient to smallest clustering coefficient, until a desired value of SCF is obtained;
   (e) placing the disrupted nodes in order of betweenness centrality, wherein the betweenness centrality is a measure of how frequent a disrupted node is a bridge between otherwise disconnected groups of intra-linked nodes, and simulating restoration of the disrupted nodes to functionality, in order from largest betweenness centrality to smallest betweenness centrality, until a desired value of SCF is obtained;
   (f) placing the disrupted nodes in order of closeness centrality, wherein the closeness centrality is an inverse of a summation of a number of network steps between a node and other nodes, and simulating restoration of the disrupted nodes to functionality, in order from smallest closeness centrality to largest closeness centrality, until a desired value of SCF is obtained;
   (g) placing the disrupted nodes in order of eigenvector centrality, wherein the eigenvector centrality is a sum of the centrality values of each node that is linked to a disrupted node, and simulating restoration of the disrupted nodes to functionality, in order from largest eigenvector centrality to smallest eigenvector centrality, until a desired value of SCF is obtained; and
   (h) placing the disrupted nodes in a random order, and simulating restoration of the disrupted nodes to functionality in the random order, until a desired value of SCF is obtained.

16. The method of claim 1, wherein node attributes and link attributes include one or more of:
   (a) strength measured as a volume of originations or terminations at a node or measured as a number of objects originating or terminating at the node;
   (b) strength measured as a volume of traffic along a link;
   (c) financial value associated with a node or a link in terms of a cost of repairing, recovering, or replacing the node, or a cost of repairing, recovering or replacing the link;
   (d) financial value associated with a node or a link in terms of business interruption costs related to the node or the link being out of service,
   (e) geospatial information, including one or more of latitude, longitude, and height above sea level,
   (f) a quantifiable social cost or variable associated with a node, including one or more of a poverty rate, an employment rate, a quantification of access to social services, and a quantification of access to alternative transportation,
   (g) civil infrastructure data associated with a node or a link,
   (h) natural environment data associated with a node or a link.

17. A method of recovering a network from a state of disruption to a state of partial or complete functionality, the network comprising a plurality of nodes interconnected by links, the network subject to disruption that removes from the network one or more nodes, one or more links, or a combination of one or more nodes and one or more links, wherein a disrupted node comprises a node through which traffic cannot flow and a functional node comprises a node through which traffic can flow, the method comprising:
   performing the method of claim 1; and
   implementing the recovery sequence, comprising restoring at least a first disrupted node or a first disrupted link to functionality according to the recovery sequence.

18. The method of claim 17, wherein the network is selected from the group consisting of a transportation network, an energy network, a telecommunication network, an Internet network, a water supply network, a wastewater network, a financial network, a social network, a climate and weather network, a geopolitical network, an ecological network, or a disease network.

19. The method of claim 17, wherein the network comprises a telecommunication network or an Internet network.

* * * * *